Aug. 3, 1926.
E. R. STAMBACH
1,594,985
VEHICLE SIGNAL
Filed March 25, 1924     2 Sheets-Sheet 2
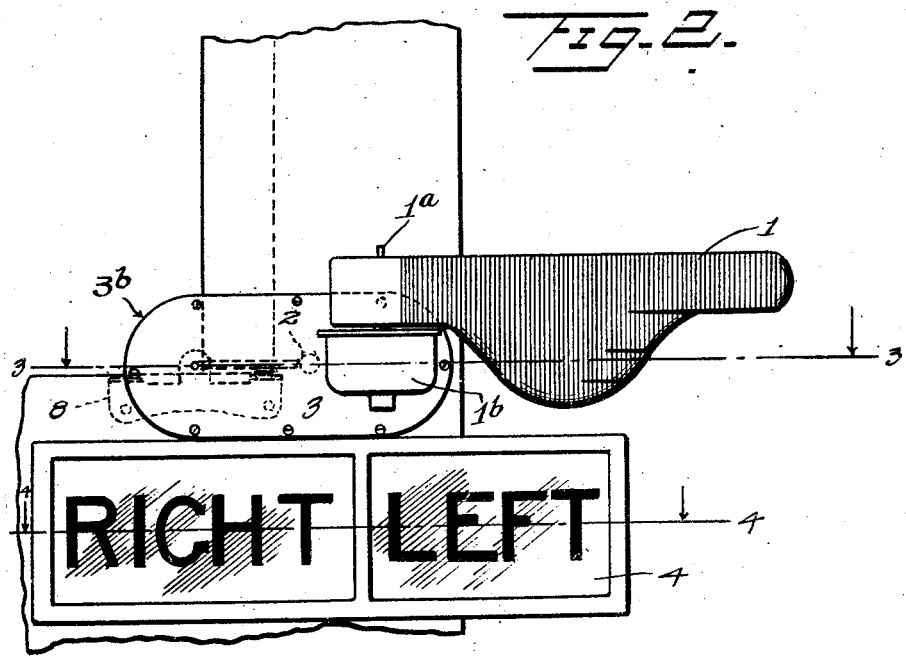
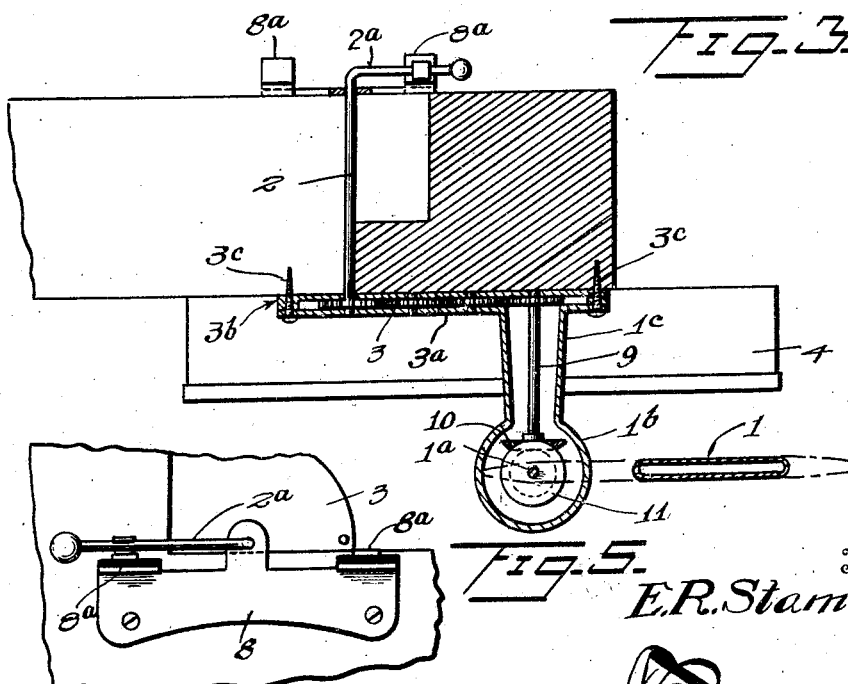
Inventor
E. R. Stambach Patented Aug. 3, 1926.

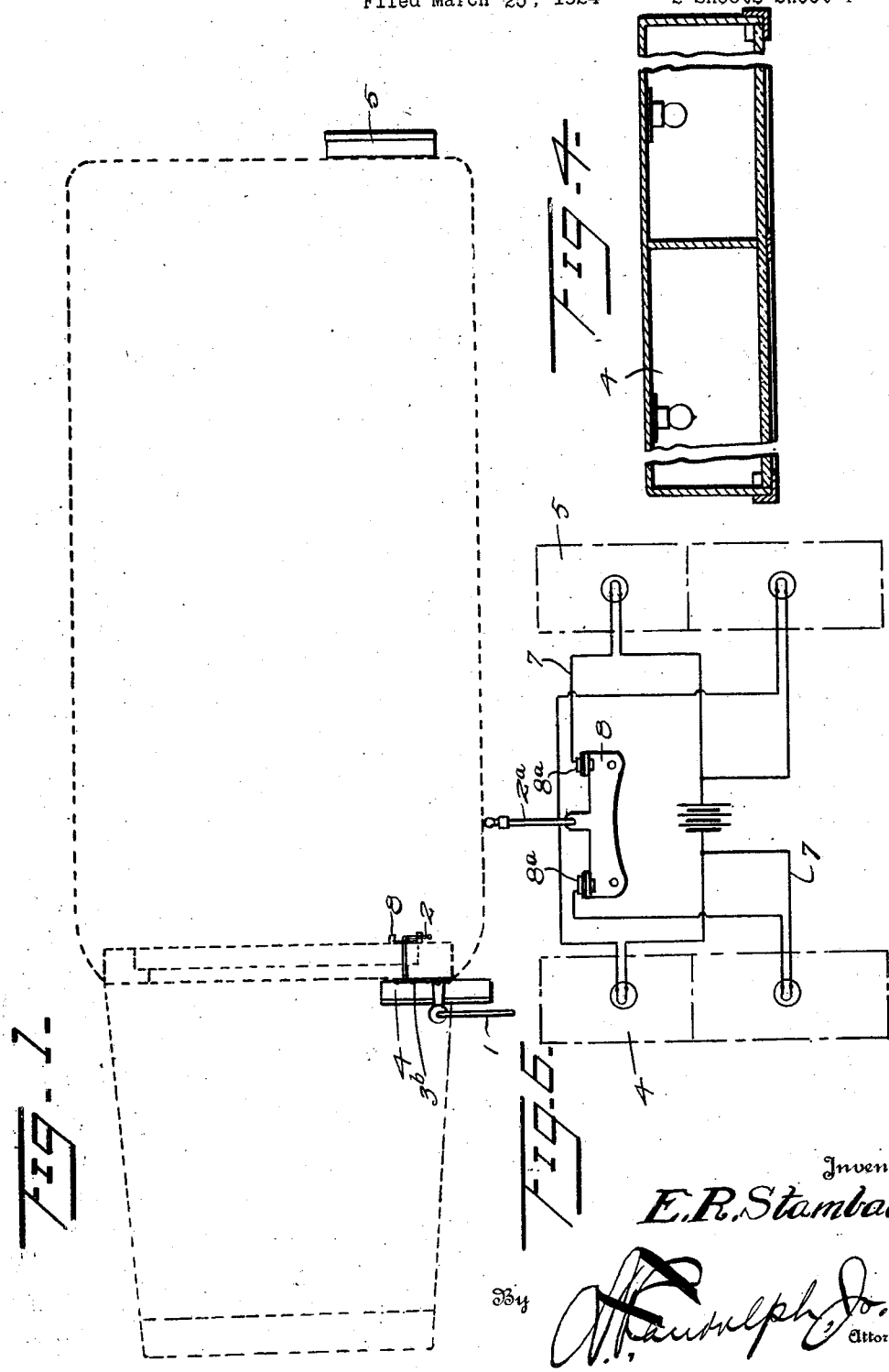

1,594,985

UNITED STATES PATENT OFFICE.

EDWARD R. STAMBACH, OF KENNETT SQUARE, PENNSYLVANIA.

VEHICLE SIGNAL.

Application filed March 25, 1924. Serial No. 701,820.

The invention has relation to vehicular signaling means for use in traffic to indicate the intention of the driver when about to make a turn either to the right or to the left, thereby advising a traffic officer as to the direction of travel and giving warning to the driver of a vehicle in the rear so as to avoid a rear-end collision.

Other objects and advantages will be apparent and suggest themselves as the nature of the invention is understood.

While the drawings illustrate an embodiment of the invention it is to be understood that in adapting the same to meet different conditions and requirements, various changes in the form, proportion and minor details of construction may be resorted to without departing from the spirit of the invention.

Referring to the accompanying drawings forming a part of the application:

Figure 1 is a diagrammatic view illustrating the application of the invention,

Figure 2 is a detail front view of the mechanically operated signal,

Figure 3 is a sectional view on the line 3—3 of Figure 2,

Figure 4 a detail section on the line 4—4 of Figure 2,

Figure 5 is an elevation of the signal operator and switch, and

Figure 6 is a diagram of the wiring.

Corresponding and like parts are referred to in the following description and designated in the several views of the drawings by like reference characters.

The invention is particularly adapted for closed cars and obviates the necessity for lowering the window or keeping the same open in order to signal by extending the hand. The numeral 1 designates an indicator which, in the preferred form, has the outline of the human hand with the index finger extended. This indicator is pivoted so as to turn about a vertical axis and project to the right or to the left to indicate the direction of turn when the driver intends to depart from a direct course. A shaft 2 is disposed within convenient reach so as to be easily manipulated from within the car and connecting means, such as gearing 3, are interposed between the shaft 2 and indicator 1 to effect a pivotal movement of the latter when the shaft 2 is operated. In the normal position of the indicator, the same designates a direct course, but it may be swung laterally to indicate the intention to make either a right or a left turn as required.

The indicator 1 is carried by a shaft $1^a$ which is journaled in the upper and lower sides of the head $1^b$ of an arm $1^c$. The head $1^b$ and the arm $1^c$ are hollow and the former is located at the forward end of the latter. The arm $1^c$ is fixed to the cover plate $3^a$ of the casing $3^b$ for the gears 3. The arm $1^c$ is located adjacent one end of the cover plate $3^a$ and extends forwardly therefrom. The cover plate $3^a$ is secured to the gear case $3^b$ by means of screws $3^c$ some of which are employed to secure the signal to the automobile in the manner illustrated in Figures 2 and 3 of the drawings. A shaft 9 is journaled in the head $1^b$ and arm $1^c$ and has one of the gears 3 secured to its rear end. At its front end, the shaft 9 carries a bevel gear 10 which meshes with a bevel gear 11 carried by the shaft $1^a$. The shaft 2 is provided at its rear end with an operating arm $2^a$ and has one of the gears 3 secured to its front end. A bracket 8 in which the rear end of the shaft 2 is journaled is provided at opposite sides of the shaft with stops $8^a$ adapted to limit the throw of the arm $2^a$ during the operation of the signal, and upon which the arm rests when the signal 1 is in either of its extreme positions. The stops $8^a$ are of metal and insulated from the bracket 8 as shown in Figures 5 and 6 so that when the indicator 1 is in either of its extreme positions circuits to certain signaling lamps will be closed in a manner to be presently set forth.

Front and rear signal lights 4 and 5, respectively, are provided and are included in an electric circuit 7 which is controlled by means of the arm $2^a$ and stops $8^a$. Each signal light includes the words "Left" and "Right" and corresponding words at the front and at the rear of the vehicle are displayed at the same time upon operating the switch to close the circuit including the same, and as a result a like signal is displayed at the front and at the rear of the vehicle to avoid any possible confusion. These signal lights are intended to be used after dark. During the day the indicator 1 is sufficient and is so located as to be seen from either side and from the front or in the rear of the vehicle.

What is claimed is:

1. A vehicle signal comprising an elongated case, an arm extending forwardly from one end of the case, a vertical shaft journaled in the front end of the arm, an indicator carried by the shaft, a gear carried by the shaft and arranged within the arm, a second shaft journaled in the arm and carrying a gear meshing with said first gear, a third shaft extending rearwardly from the other end of the case, and means establishing a driving connection between said second and third shafts.

2. A vehicle signal comprising an elongated case, an arm secured to and extending forwardly from one end of the case, a vertical shaft journaled in the front end of the arm, an indicator carried by said shaft, a gear carried by said shaft and located within the arm, a horizontal shaft journaled within the arm, a gear carried by the front end of the horizontal shaft and meshing with said first gear, a horizontal operating shaft extending rearwardly from the other end of the case and provided at its rear end with an arm, gears located within the case to establish driving connection between said horizontal shafts, a bracket in which the rear end of the rearwardly extending horizontal shaft is journaled and provided with stops arranged upon opposite sides of said shaft to limit the throw of its arm during the operation of the signal.

In testimony whereof I affix my signature.

EDWARD R. STAMBACH.